US006825860B1

(12) United States Patent
Hu et al.

(10) Patent No.: US 6,825,860 B1
(45) Date of Patent: Nov. 30, 2004

(54) AUTOSCALING/AUTOSIZING USER INTERFACE WINDOW

(75) Inventors: Jung-Hsiang Hu, Milwaukee, WI (US); Steve Fischer, Mequon, WI (US); Lou Klein, Grafton, WI (US); Kevin Retlich, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 670 days.

(21) Appl. No.: 09/675,866

(22) Filed: Sep. 29, 2000

(51) Int. Cl.[7] .................................................. G06F 3/00
(52) U.S. Cl. ....................... 345/801; 345/660; 345/788; 345/800
(58) Field of Search ................................ 345/619, 660, 345/661, 666, 667, 668, 700, 733, 736, 764, 765, 772, 781, 784, 788, 800, 801, 734

(56) References Cited

U.S. PATENT DOCUMENTS

| | | | |
|---|---|---|---|
| 4,759,123 A | 7/1988 | Ohta et al. ..................... 29/832 |
| 5,459,832 A | * 10/1995 | Wolf et al. .................. 345/769 |
| 5,467,451 A | * 11/1995 | Burkis et al. ............... 345/856 |
| 5,557,728 A | * 9/1996 | Garrett et al. .............. 345/801 |
| 5,613,115 A | 3/1997 | Gihl et al. ................... 395/701 |
| 5,654,902 A | 8/1997 | Scheidt et al. ......... 364/551.01 |
| 5,708,798 A | 1/1998 | Lynch et al. ................ 395/500 |
| 5,847,706 A | * 12/1998 | Kingsley .................... 345/788 |
| 5,949,335 A | 9/1999 | Maynard ................. 340/572.1 |
| 6,003,012 A | 12/1999 | Nick ........................... 705/10 |
| 6,009,406 A | 12/1999 | Nick ........................... 705/10 |
| 6,044,411 A | 3/2000 | Berglund et al. ............... 710/9 |
| 6,054,987 A | 4/2000 | Richardson ................. 345/348 |
| 6,157,389 A | * 12/2000 | Knowlton ................... 345/660 |
| 6,167,383 A | 12/2000 | Henson ........................ 705/26 |
| 6,180,868 B1 | 1/2001 | Yoshino et al. ............. 136/244 |
| 6,229,540 B1 | * 5/2001 | Tonelli et al. ............... 345/735 |
| 6,246,919 B1 | 6/2001 | Hassel ........................ 700/116 |
| 6,253,220 B1 | * 6/2001 | Le Beux et al. ............. 715/530 |
| 6,262,550 B1 | 7/2001 | Kliman et al. ............... 318/565 |
| 6,384,842 B1 | * 5/2002 | DeKoning et al. .......... 345/734 |
| 6,400,375 B1 | * 6/2002 | Okudaira .................... 345/668 |
| 6,414,698 B1 | * 7/2002 | Lovell et al. ................ 345/800 |
| 6,456,305 B1 | * 9/2002 | Qureshi et al. ............. 345/800 |
| 6,466,836 B1 | 10/2002 | Astarabadi .................. 700/115 |
| 6,473,093 B1 | * 10/2002 | Halstead et al. ............ 345/619 |
| 6,496,945 B2 | 12/2002 | Cepulis et al. ................ 714/25 |
| 6,603,493 B1 | * 8/2003 | Lovell et al. ................ 345/800 |
| 6,667,750 B1 | * 12/2003 | Halstead et al. ............ 345/788 |

FOREIGN PATENT DOCUMENTS

| | | | |
|---|---|---|---|
| EP | 0 088 591 A2 | 9/1983 | ............ G07C/3/14 |
| JP | 410083271 A | * 3/1998 | |
| WO | WO 99/16073 A2 | 4/1999 | ........... G11B/25/04 |

OTHER PUBLICATIONS

Walt Crawford, "BodyWorks 6.0", Feb./Mar. 1998, Journal article, Database v21n1, p. 83–84.*

Dave Kosiur, "Kaleidagraph 2.0", Apr. 1, 1990, MacWorld, v7, n4, p. 197 (2).*

Ralph Grabowski, "ArchiCAD gives architects every needed design tool", Mar. 20, 1995, InforWorld, vol. 17, issue 12, p. 110, 1/3p, 1 chart, 1c.*

* cited by examiner

Primary Examiner—X. L. Bautista
(74) Attorney, Agent, or Firm—Patrick S. Yoder; Alexander M. Gerasimow

(57) ABSTRACT

A technique is provided for generating, resizing and rescaling an image. The image may be of a physical system, and may be based upon data collected from components via a data network. Elements in the image are associated into logical groups. The image is displayed in a display area, the dimensions of which may be changed by a user. Upon a change in a first dimension of the display area, the image is rescaled so as to maintain an original aspect ratio of the image. Resizing of the display area in a second direction does not rescale the image, but changes the number of logical groups displayed.

30 Claims, 6 Drawing Sheets

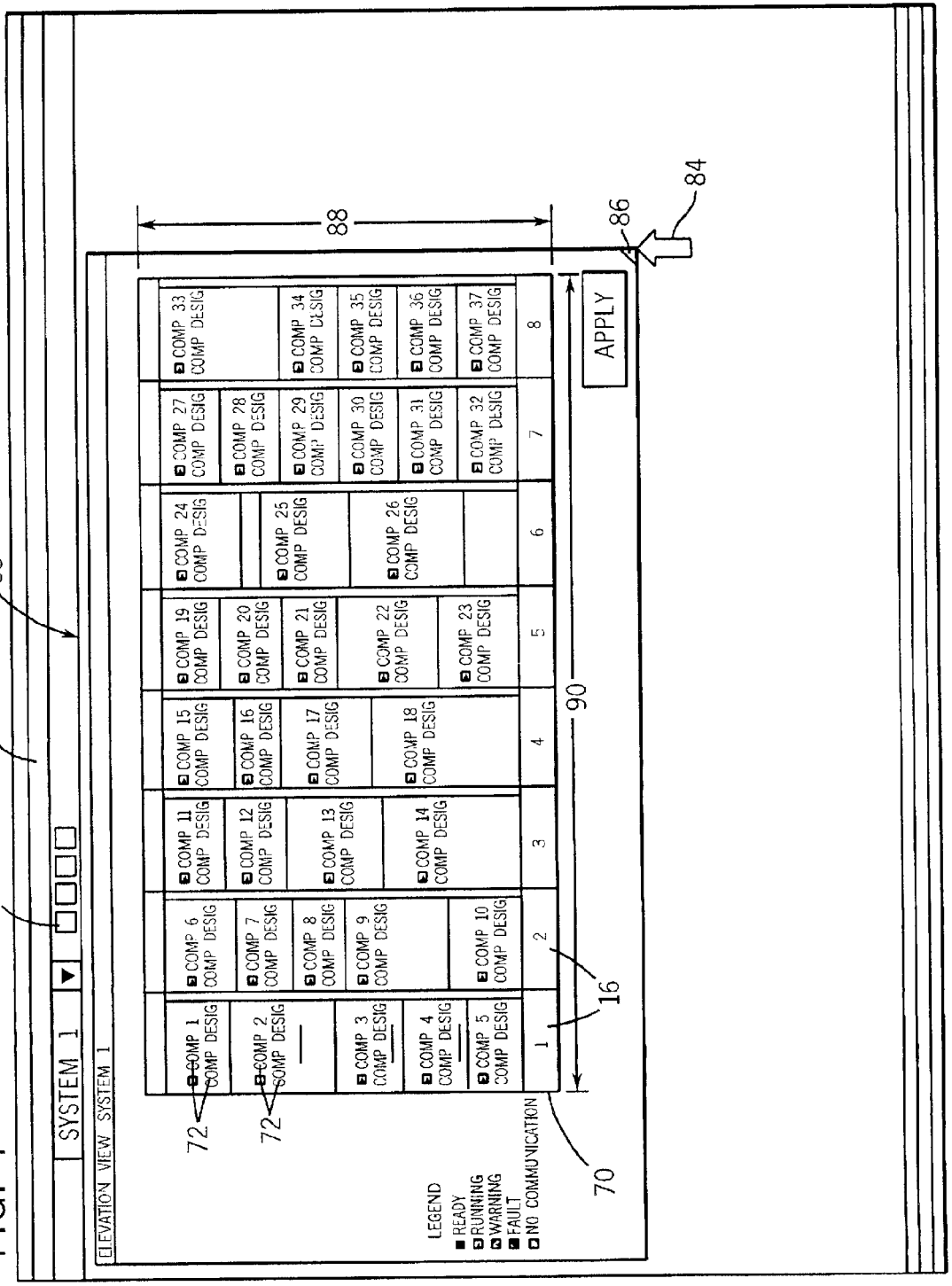

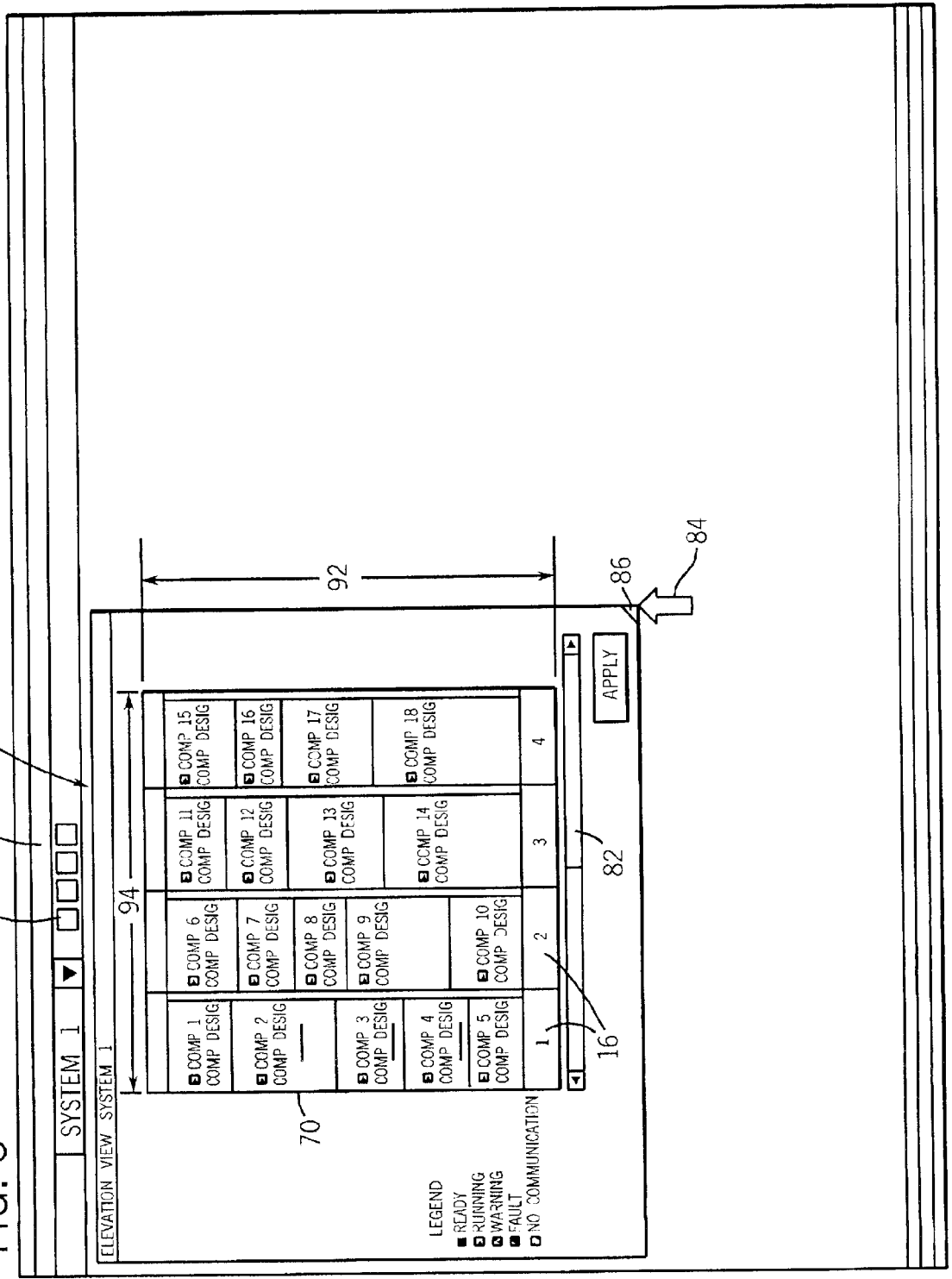

AUTOSCALING/AUTOSIZING USER INTERFACE WINDOW

BACKGROUND OF THE INVENTION

The present invention relates generally to the field of physical systems and networks, and to displays for representing such systems. More particularly, the invention relates to a technique for scaling and viewing reconstructed representations of a system or physical implementation of a set of objects.

Various physical systems are configured and built in accordance with reconstructed representations viewable on computer monitors and the like. Displays of systems, diagrams, physical views, and so forth are typically provided on computer monitors in windows or viewing areas which may be resized by setting scaling factors or by dragging sizing tools, such as with a mouse or similar input device Where proportionate sizing is desired, certain applications allow for resizing of vertical and horizontal dimensions uniformly to maintain proportions in those directions. Such resizing does, however, alter the level of detail visible in the display, making relatively small features difficult to view.

In applications where less than a complete view of a system or image can be had in a window, it is common to provide a scroll bar or similar virtual tool to permit a user to displace the virtual image within the viewing window. A user may thus survey portions of a representation viewable in the display window, so as to select features of interest, which may be seen in greater detail by zooming in or out on such features as desired. Certain applications incorporate both this selectable viewing and scrolling feature with scaling of horizontal and vertical dimensions.

Certain types of representation are difficult to view in conventional windowing and scaling programs. For example, where the subject matter of depiction has discrete units or sections which are logically displayed in groups, scaling alone does not maintain a desired level of detail visible when the window size is reduced on a monitor. Where the detail is desired, zooming may be available, but conventional zooming algorithms increase an entire area of a representation, without distinction between logical boundaries between items in the depiction or their grouping.

By way of example, in an industrial automation context, systems of components may be associated with one another in a physical layout. The system view may be reconstructed to approximately represent the layout of the components. Where the components are situated in enclosures, then, the approximate positions of components in the enclosures may be depicted in the representation viewable by the user on a monitor. The user may then desire to maintain a view of suitable size to read indicia or text labeling on the components, but may not want the entire monitor screen to be occupied by the system view, making scaling of the entire image alone unsuitable. However, where zooming functions are utilized, specific component sections may no longer be viewable in the reconstructed representation, making partial sections alone viewable which are not useful to the user.

Similar issues arise in representations of other types of systems. For example, architectural representations may include distinct subunits, such as sections or floors of a building which are most usefully viewed as subunits. Where scaling alone is used, detail of the specific features may be lost, while zooming alone does not take into account the discrete groups of components which may comprise a building sections or floor. Diagrammatical representations, including charts, system diagrams, and the like may also include logical groupings which would be best viewed together, despite a level of scaling or zooming which is selected by a user.

There is, at present, a need for an improved windowing and scaling technique which can permit such viewing of logical groupings, while allowing for scaling of an overall system or representation.

SUMMARY OF THE INVENTION

The present invention provides a novel technique for sizing and scaling a representation on a computer monitor designed to respond to these needs and drawbacks of existing approaches. The technique is particularly well suited to use in software which allows for viewing of physical system layouts, diagrams, and the like, wherein components or features are associated into groups. A user may desire viewing of one or more of the groups as discrete units to maintain visibility of specific details. The groups are then defined for presentation in the representations, and the group associations are maintained in the depiction displayed within a viewing window.

The technique conveniently allows for scaling in one direction and snap-type feature selection in a second orthogonal direction. For example, in a physical depiction of a system, a vertical direction may be autoscaled by dragging a virtual tool on the display, such as via a mouse. The scaling in the vertical direction then proportionately changes the size of the elements depicted in the representation. Resizing in the horizontal direction then allows for selection of discrete subsections or units of the physical system depicted in the image. The sections may include machine elements, system components, or any other logical association of the elements of the representation. Thus, when the representation is resized in the horizontal direction, no loss of feature detail is experienced by the user, although the number of logical groups displayed or expanded is reduced. Additional windowing may be offered, such as through scroll bars, allowing the user to view other logical groupings eliminated from view by the resizing selection.

The technique may, of course, be adapted for various types of systems, and for scaling or sizing in vertical, horizontal, or other directions. In an exemplary implementation, horizontal and vertical directions are utilized, with an exemplary depiction being of a motor control center in an industrial automation setting. However, the inventive technique is applicable in a range of fields, where user viewable depictions or representations include logical groupings of features that for which details could be lost or less useful or viewable by the user if scaling and zooming alone are employed.

BRIEF DESCRIPTION OF THE DRAWINGS

The foregoing and other advantages of the invention will become apparent upon reading the following detailed description and upon reference to the drawings in which:

FIG. 4 is a representation that like of FIG. 3, but wherein the depiction of the system has been rescaled in a vertical direction;

FIG. 5 is a representation such as that shown in FIG. 4, wherein the viewing window in which the system depiction is provided has been resized by selection of portions of the system in accordance with logical associations or groups of components, with no loss of detail.

DETAILED DESCRIPTION OF SPECIFIC EMBODIMENTS

Figure 1:
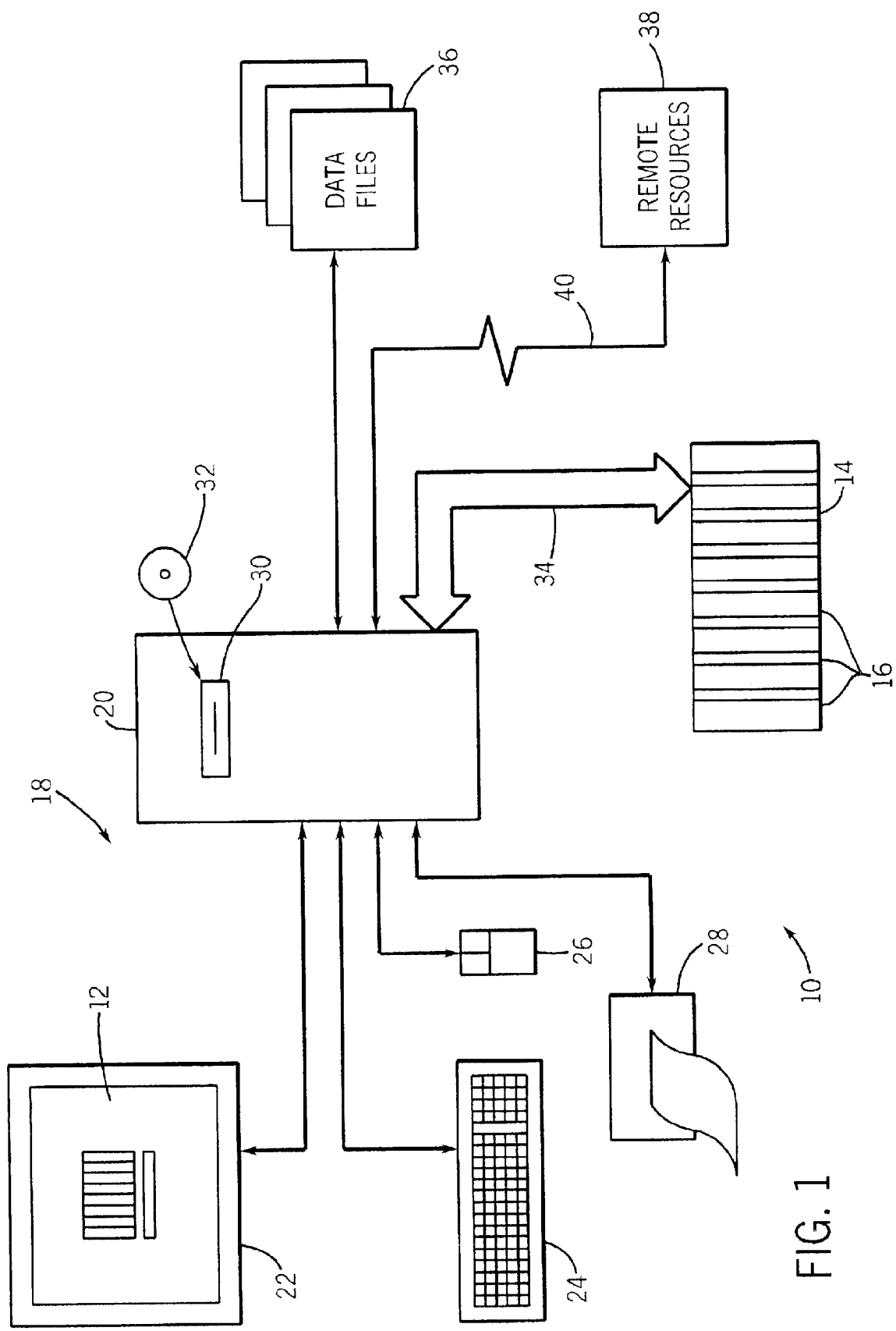
FIG. 1 is a diagrammatical representation of an exemplary physical system and of a viewing station for producing a user viewable representation of the system in accordance with aspects of the present technique.

Turning now to the drawings, and referring first to FIG. 1, a system 10 is illustrated for viewing representations of systems having components or elements which are logically grouped. In the illustrated embodiment, system 10 is designed to be connected to a system, such as in an industrial automation context, and produce dimensionally approximate physical layout views of equipment. The representation 12 is displayed for manipulation and observation by a user as described more fully below. System 10 includes, in the illustrated embodiment, the actual physical system 14 of which the representation is made. The physical system 14, in turn, includes sections or groups 16 comprising associated components which are represented as such in the representation. The system further includes a viewing station 18 comprising a computer 20, a monitor 22 on which the representation 12 is displayed, and input devices such as a keyboard 24 and a mouse 26. Other peripheral devices may include output devices such as a printer 28.

The viewing station includes hardware and software for storing the representation, or for building the representation in real time in accordance with aspects of the present technique. Any suitable computer workstation may be employed for viewing station 18. The viewing station also includes memory devices such as a disk drive 30 designed to receive optical, magnetic, or any suitable memory support medium 32. In the illustrated embodiment, the viewing station 18 is designed to be connected directly to a data network 34 linked to the physical system 14. In an industrial automation context, data network 34 may include cabling, connectors, transceivers, and any other interface circuitry for exchanging device data via a predefined protocol. In a present embodiment, the data network 34 enables data to be collected from the components of physical system 14 for building the representation 12 in the viewing station. Other data useful in the functions of the viewing station, including the building of the views described herein, are stored on data files 36 either within the viewing station or external to the viewing station. Moreover, the viewing station may draw data from remote resources 38, such as via a wide area network 40, including the Internet.

The illustrated embodiment enables representation to be generated for physical systems in real time based upon data extracted from the physical system itself. By way of example, data may be stored in the physical system, such as in system components, which is indicative of the identity of the components, their physical position within the system, their dimensions, and so forth. Based upon such data, the viewing station can reconstruct, in real time, a representation providing an approximate dimensionally accurate view of the components and the various groups in which they are disposed. It should be noted, however, that the present technique may find application in other settings, in which representations are made based upon data files alone. Similarly, the scaling and sizing techniques described herein may find application in software which does not represent a physical view of a component or a system, but represents diagrammatical views, such as charts, diagrams or the like.

Figure 2:
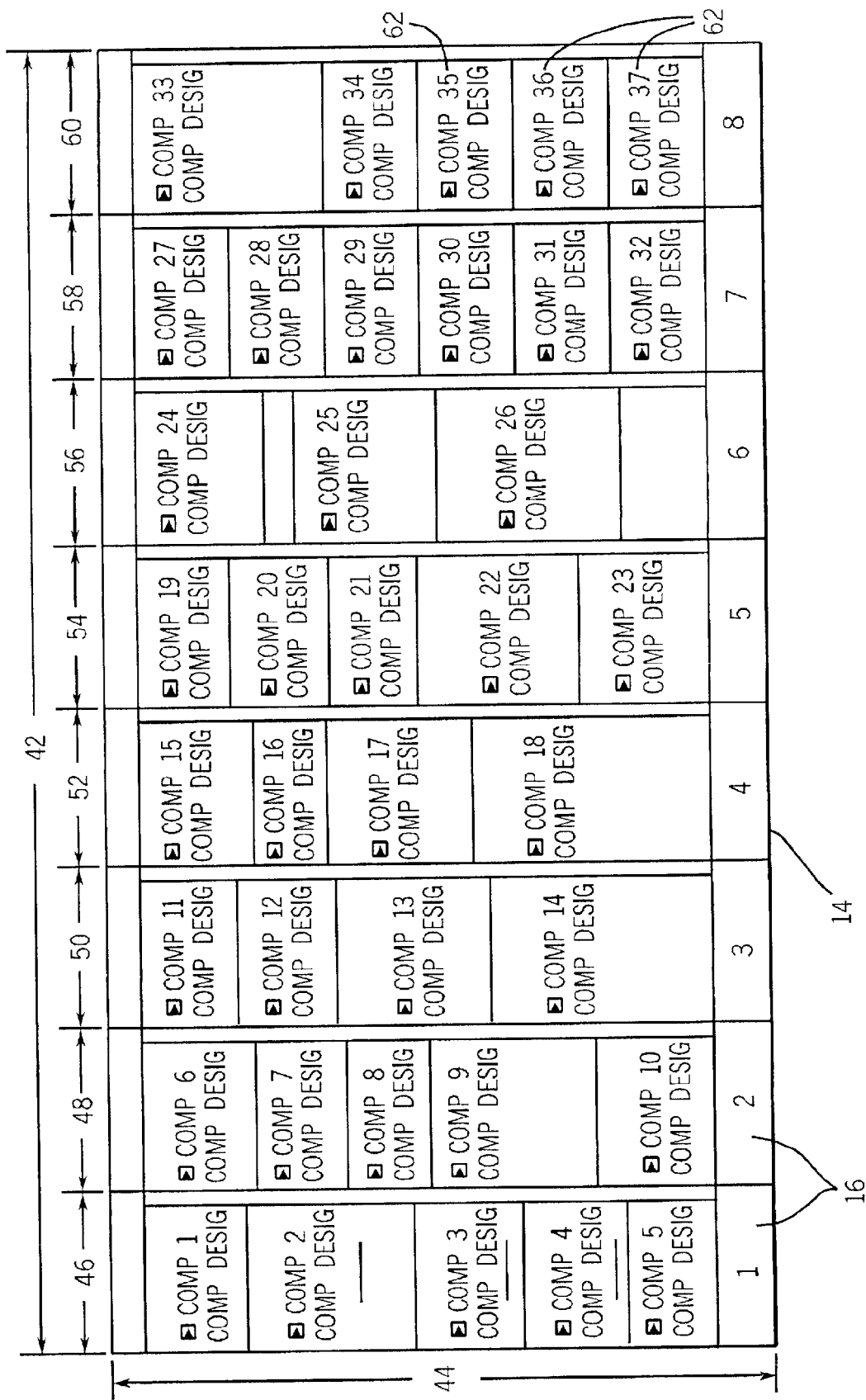
FIG. 2 is a more detailed representation of the exemplary physical system of FIG. 1, illustrating logical groupings and dimensions of the physical system which are manipulated in your user representation.

FIG. 2 illustrates in greater detail the exemplary physical system 14 which is reproduced in the representation. The physical system illustrated includes a series of eight sections or logical groupings 16. The overall width of the physical system is indicated by reference numeral 42, while its height is represented by reference numeral 44. In the case of physical system 14, the group 16 comprise vertical sections placed side-by-side. The section widths 46, 48, 50, 52, 54, 56, 58, and 60 are in the illustrated embodiment equal in dimension, although this need not be the case. Within each logical group 16, a series of components 62 are positioned. In an industrial automation context, for example, the components may include electrical devices for controlling delivery of power to loads such as electric motors, actuators, and so forth. The components themselves may include such devices as relays, circuit breakers, contactors, motor controllers, motor starters, and so forth.

The groups 16 of components are predefined by a logical association. In the exemplary embodiment illustrated, this logical association is simply the disposition of the components in vertical sections. Because the representation desired in this example is a physical layout view of the components, the logical association of the components in vertical groups permits the user to locate individual components in the groups, such as for servicing, maintenance, or ongoing monitoring. In other contexts, however, the logical groupings may include horizontal sections, horizontal and vertically limited areas or regions, or any other logical sub-grouping of the elements depicted in the representation.

Figure 3:
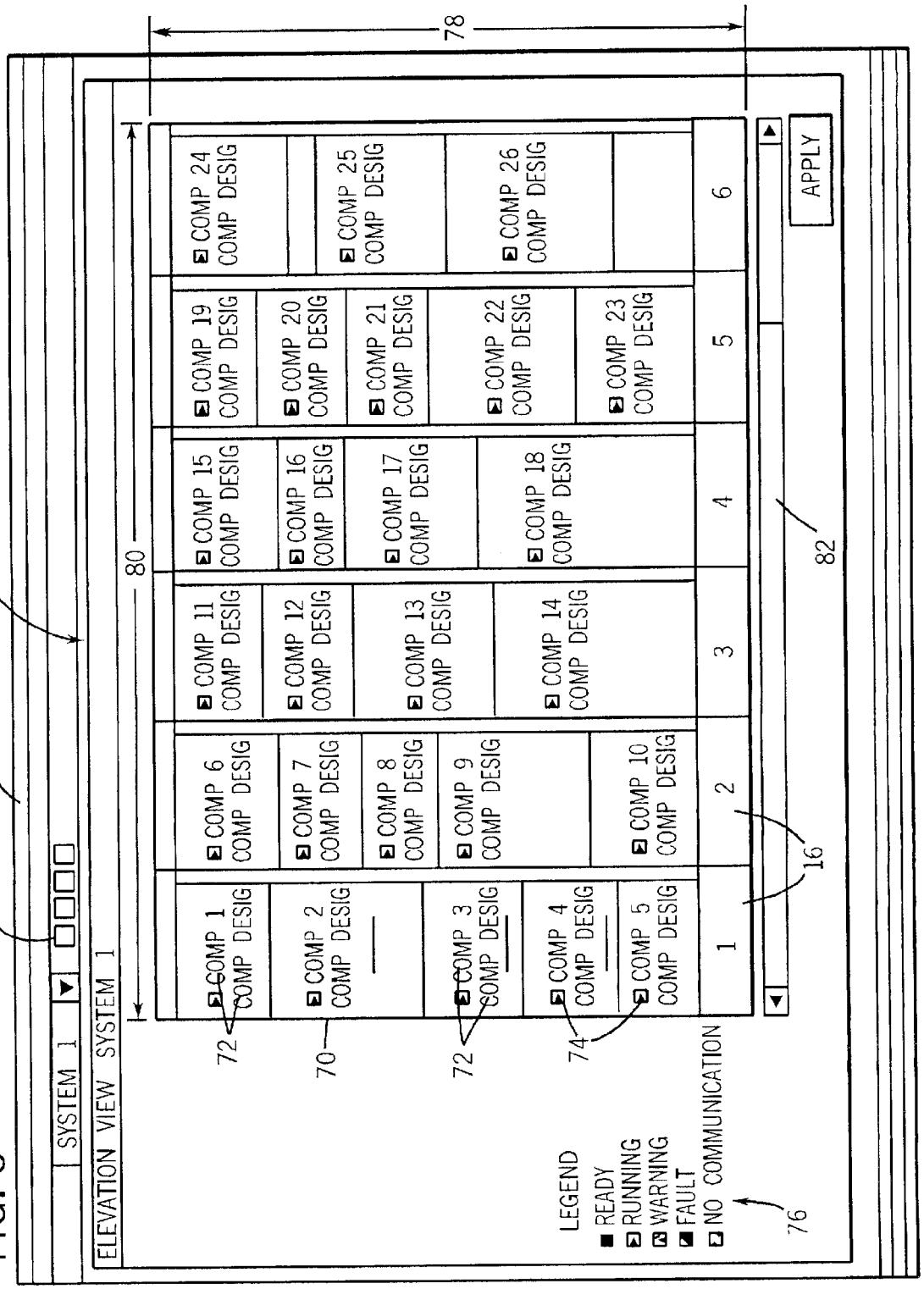
FIG. 3 is a representation of the physical system of FIG. 2 on a monitor, illustrating a full vertical scaling of the representation to provide a maximum degree of detail for system components.

The representation 12 of the exemplary system illustrated in Figure is shown in somewhat greater detail in FIG. 3. As illustrated in FIG. 3, the representation is reproduced in a conventional monitor screen 64 viewable by the user. The screen includes one or more tool bars 66 which comprise a series of textual labels, icons, actuatable virtual devices, and so forth. A display area 68 is available for the representation, and a window including the component depiction 70 may be expanded to the extent of the display area 68.

In the view illustrated in FIG. 3, the physical system 14 shown in the previous figures is depicted including labels 72 for each component, along with a status icon 74. The labels 72 and status icons 74 are illustrated by way of example. In practice, any features or details in the representation may be displayed, and are treated in the scaling and sizing of the representation as described below. In the illustrated embodiment, a legend 76 accompanies the component depiction 70.

The component depiction has a height 78 as shown in FIG. 3, and a width 80. The height and width of the depiction determine the number of logical groupings shown, as described more fully below. In general, however, the height 78 is used in the present embodiment to define scale of the component depiction 70, while the width 80 defines the number of groupings illustrated. The aspect ratio of the groupings, however, is maintained in the sizing and scaling operations. Where the scaling performed by selection of the appropriate desired height 78 does not permit all of the groups to be illustrated in the component depiction 70, a scroll bar 82 is provided adjacent to a depiction, allowing the user to scroll to a different portion of the system by integer snapping to the logical groups. In the example of FIG. 3, six of the eight sections of the physical system fit within the component depiction 70.

As noted above, the representation may be scaled, in a vertical direction in the present embodiment. FIG. 4 illustrates the representation of FIG. 3 rescaled in a vertical direction by use of a virtual drag tool 84. The drag tool 84 may select any suitable location, or specific locations on the depiction such as a corner 86 in the illustrated embodiment. As the corner is dragged inwardly, to a desired new height 88, the entire system depicted in the representation is rescaled accordingly. While the height is rescaled in the illustrated view of FIG. 4, the width 90 is maintained equal to the width 80 of FIG. 3. Because the width to height ration permits more discrete groups to fit within the view, while maintaining the same aspect ratio of the individual components and groups, all eight sections of the physical system are now viewable. It should also be noted that, while the components are rescaled, labels, status icons, and the like may be similarly rescaled or may maintain an original size. Details of the groups and sections, however, are maintained for viewing by the user.

The user, in addition to rescaling in the vertical direction, may resize the representation in a horizontal direction as indicated in FIG. 5. As shown in FIG. 5, a drag tool 84 may be used to maintain height 92 equal to height 88 of FIG. 4, while altering the desired width 94 of the depiction. The height of the depiction could, of course, be altered as well, but is maintained constant between FIGS. 4 and 5 for explanatory purposes. Because the new width 94 of the depiction does not permit the entire system to be viewed without rescaling the aspect ratio of the components or groups, the number of groups illustrated in the depiction is reduced, to four sections in the example shown. Again, because the number of groups illustrated is reduced, a scroll bar 82 is inserted below the depiction, thus, although the user has made available a greater portion of the display area 68 for other documents, views, applications, windows and the like, no loss of feature detail is experienced between the manipulations made from FIG. 4 to FIG. 5.

Figure 6A:
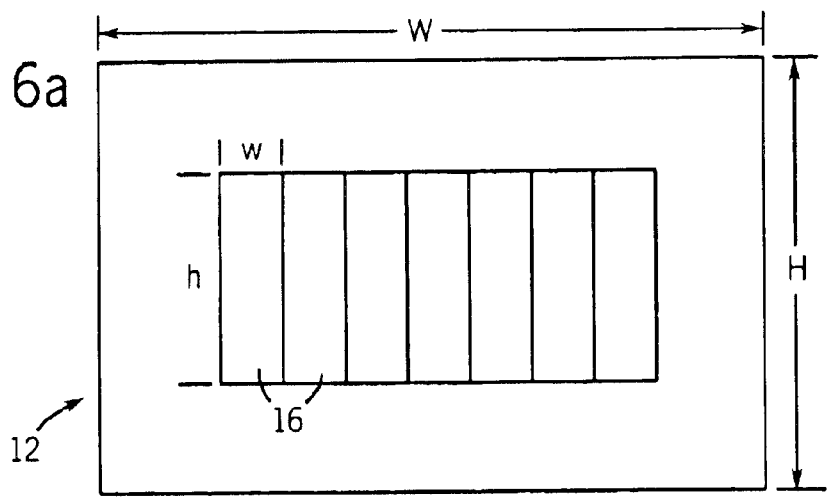
FIG. 6 is a flow chart illustrating exemplary steps in control logic for producing and manipulating the representations shown in the foregoing figures.
Figure 6B:
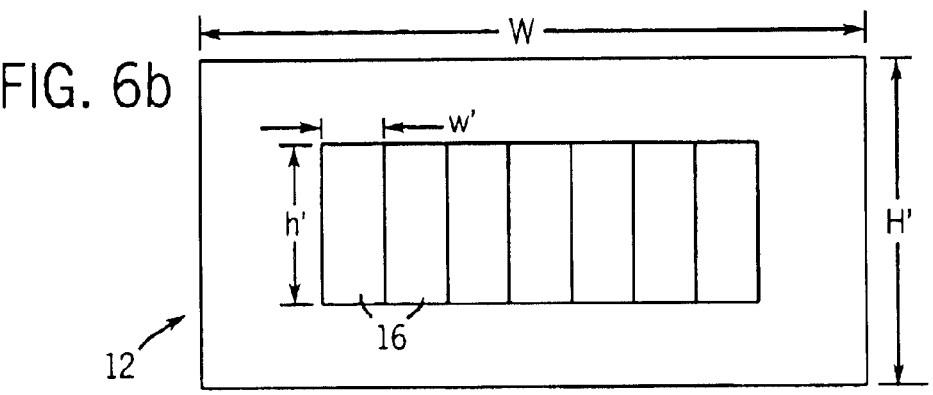
Figure 6C:
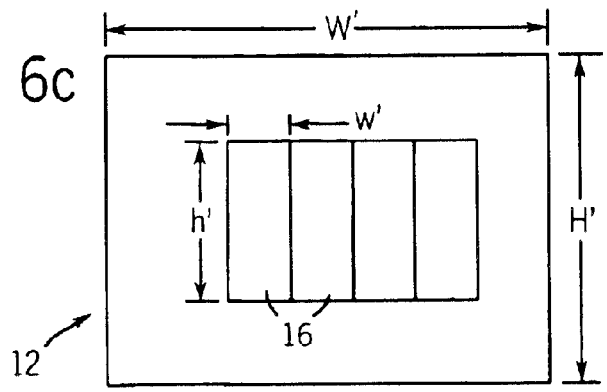

FIG. 6 illustrates the scaling and sizing operations which are performed in the foregoing technique. As shown in FIG. 6, a representation 12 is made of a physical system, in this case having a width W and a height H. The aspect ratio of the individual groups of the representation is defined, however, by the ratio of the image width to height, or w/h as shown in FIG. 6A. When the height is adjusted as shown in FIG. 6B, the new height H' causes the vertical and horizontal rescaling of the represented image, thereby maintaining the same original aspect ratio of the groups and component representations, producing a new aspect ratio w'/h' which is equal to the ratio w/h. As a new width W' is then selected, a number of groups in the view is reselected to maintain the aspect ratio defined by w'/h', as shown in FIG. 6C. Thus, the technique permits rescaling in a first direction as between the views of FIGS. 6A and 6B, with resizing as between FIGS. 6B and 6C, without reduction in the aspect ratio of the groups or loss of detail.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for sizing and scaling a display on a computer monitor, the method comprising the steps of:
    displaying an image on a computer monitor in a display area, the display area having a first dimension and a second dimension and the image having a third dimension and a fourth dimension, the third dimension and the fourth dimension defining an aspect ratio, the image being displayed in logical groupings of elements viewable in the image;
    adjusting the first dimension only of the display area; and
    rescaling the third dimension and the fourth dimension based upon the adjustment to the first dimension to maintain an aspect ratio between the third and fourth dimensions.

2. The method of claim 1, comprising the further steps of adjusting the second dimension of the display area and adjusting the image by changing a number of logical groupings viewable in the image.

3. The method of claim 2, wherein the image is displayed by whole groupings only.

4. The method of claim 1, wherein the first and third dimensions are vertical dimensions, and the second and fourth dimensions are horizontal dimensions.

5. The method of claim 1, wherein adjustments to dimensions of the display area are made via a virtual tool actuatable by an operator.

6. The method of claim 1, comprising the further step of defining the logical groupings of the elements viewable in the image.

7. The method of claim 1, wherein the image represents a physical system and the logical groupings represent components positioned within the physical system.

8. The method of claim 7, wherein the logical groupings are aligned with the first dimension of the display area.

9. The method of claim 1, where in the image is constructed based upon data collected from components coupled to one another and to a workstation via a data network.

10. A method for displaying an image on a computer workstation, the method comprising the steps of:
    defining logical groupings of elements viewable in the display;
    displaying the image within a display area, the display area having first height and width dimensions, the image having second height and width dimensions defining an aspect ratio;
    changing one of the first height and width dimensions of the display area;
    automatically rescaling the second height and width dimensions of the image based upon the change in only one of the first height or width dimension to maintain the aspect ratio of the image.

11. The method of claim 10, wherein a number of logical groupings of elements is displayed in the image in accordance with the dimensions of the display area.

12. The method of claim 11, wherein only whole logical groupings are displayed.

13. The method of claim 12, comprising the step of changing the number of logical groupings displayed in the display area based upon the change made to the dimensions of the display area.

14. The method of claim 13, wherein the display snaps to a new number of logical groupings upon changes in the number of logical groupings displayed.

15. The method of claim 10, comprising the steps of changing the other of the first height and width dimensions of the display area, and changing the number of logical groupings displayed in the display area based upon that change.

16. The method of claim 10, wherein the image comprises a predetermined number of logical groupings, and wherein less than the predetermined number of logical groupings is displayed in the image viewable by the user.

17. The method of claim 16, wherein a number of logical groupings is displayed in accordance with the dimensions of the display area and the aspect ratio.

18. The method of claim 17, comprising the further step of displaying a scroll bar for allowing different sets of logical groupings to be displayed.

19. A method for displaying an image of a physical system, the method comprising the steps of:

acquiring data from components of the physical system via a data network;

generating an image of the physical system in a display area based upon the data, the display area having first and second dimensions and the image having third and fourth dimensions;

changing the first dimension; and rescaling the third and fourth dimensions based upon the change to the first dimension to maintain an aspect ratio between the third and fourth dimensions, wherein the image includes logical groupings of representations of the components.

20. The method of claim 19, wherein the image includes only whole logical groupings of representations of the components.

21. The method of claim 20, comprising the steps of changing the second dimension of the display area, and automatically changing a number of logical groupings viewable in the display area based upon the change in the second dimension.

22. The method of claim 21, wherein the logical groupings are aligned parallel to the second dimension of the display area.

23. The method of claim 19, wherein the first and third dimensions are height dimensions, and the second and fourth dimensions are width dimensions.

24. The method of claim 19, comprising displaying descriptive indicia in the image identifying at least one of the components based upon the data.

25. The method of claim 24, comprising displaying status indicia in the image based upon the data.

26. An image display comprising:

a display area having first and second dimensions;

a virtual tool for adjusting the first and second dimensions;

an image viewable in the display area and having a third dimension parallel to the first dimension, and a fourth dimension parallel to the second dimension, both the third and fourth dimensions being automatically rescaled based only upon an adjustment in the first dimension to maintain an aspect ratio between the third and fourth dimensions; and wherein the image includes representations of logical groupings of elements.

27. The image display of claim 26, wherein the elements are displayed only by whole logical grouping.

28. The image display of claim 27, wherein the number of logical groupings displayed is changed based upon changes in the second dimension of the display area.

29. The image display of claim 27, including a scroll bar for selecting sets of logical groupings viewable in the display area.

30. The image display of claim 27, wherein the first and third dimensions are height dimensions, and the second and fourth dimensions are width dimensions.

* * * * *